Feb. 6, 1945.   E. G. BODEN   2,368,963
BEARING LUBRICATION
Filed Jan. 21, 1942   2 Sheets-Sheet 1

INVENTOR:
E. G. Boden,
by Cox, Moan &
Gravely,
HIS ATTORNEYS.

Feb. 6, 1945.   E. G. BODEN   2,368,963
BEARING LUBRICATION
Filed Jan. 21, 1942   2 Sheets-Sheet 2
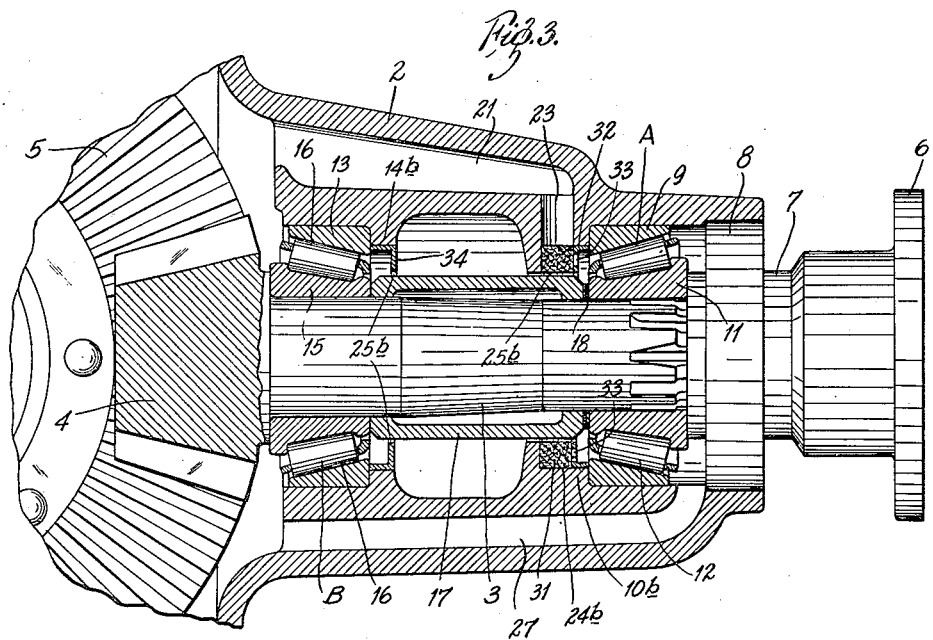
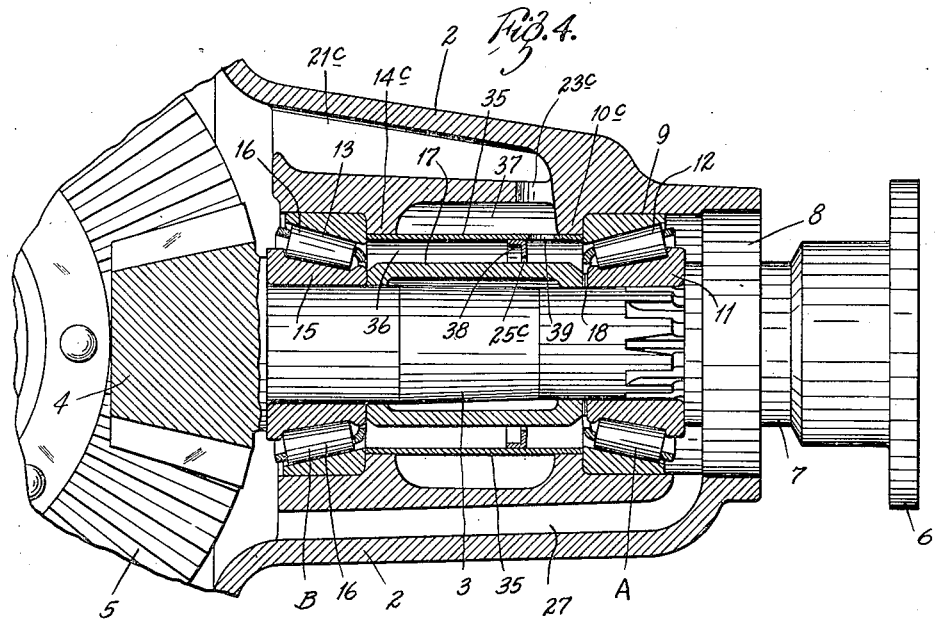
INVENTOR:
E. G. Boden
HIS ATTORNEYS Patented Feb. 6, 1945

2,368,963

UNITED STATES PATENT OFFICE 2,368,963

BEARING LUBRICATION

Ernest G. Boden, Canton, Ohio, assignor to The Timken Roller Bearing Company, Canton, Ohio, a corporation of Ohio Application January 21, 1942, Serial No. 427,545

8 Claims. (Cl. 184—11)

This invention relates to the lubrication of bearings, particularly the pinion shaft bearings of automotive driving axle constructions of the kind wherein the pinion shaft is journaled in two axially spaced bearings mounted in a lateral extension or nosing of the axle housing, oil flung off the pinion and/or driven gear in said housing is delivered between the bearings, and surplus oil is returned to said housing from a point forward of the foremost bearing. A practical objection to such construction is that oil is fed too freely to the pinion shaft bearings, thus appreciably lowering the efficiency of the axle due to the resistance of such oil in said bearings. The principal object of the present invention is to overcome this power loss in the axle by providing a relatively slow flow of the oil to the pinion shaft bearings. Other objects are simplicity and cheapness of construction and compactness of design. The invention consists in providing a restricted flow of oil from the axle housing to the forward pinion shaft bearing and a further restricted flow of such oil to the rearmost bearing; and it also consists in the construction, combination and arrangements of parts hereinafter described and claimed.

Figure 1:
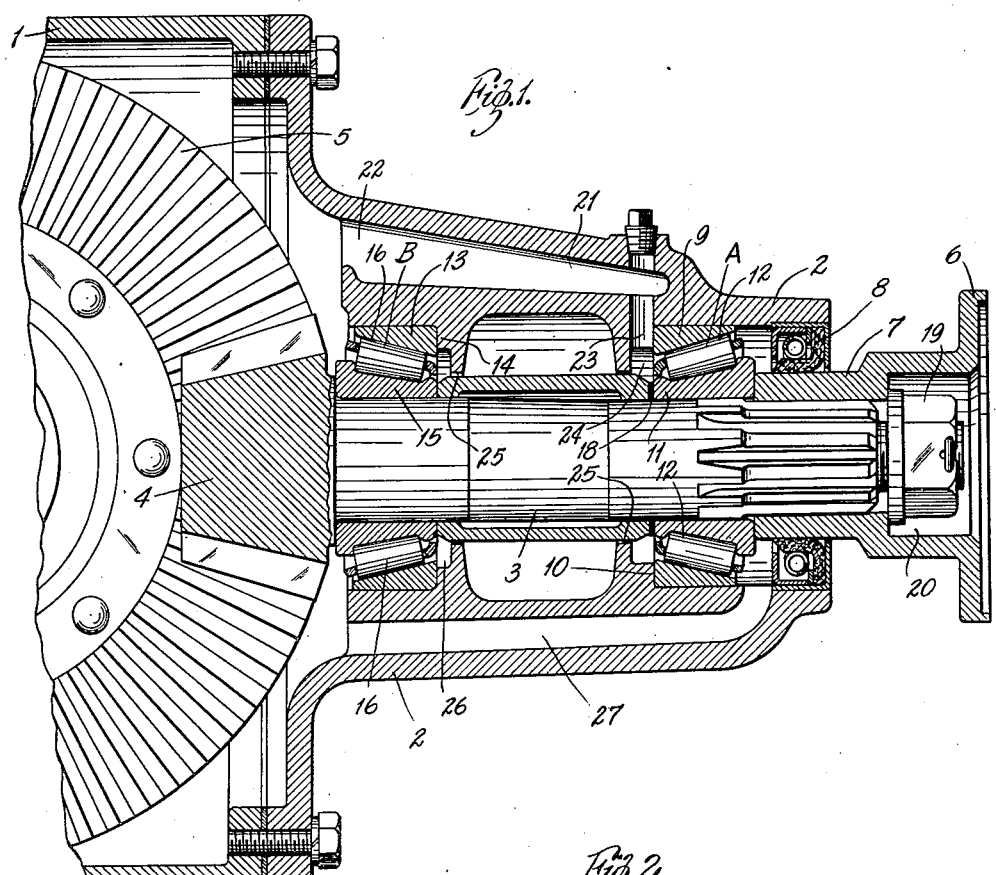
Figure 2:
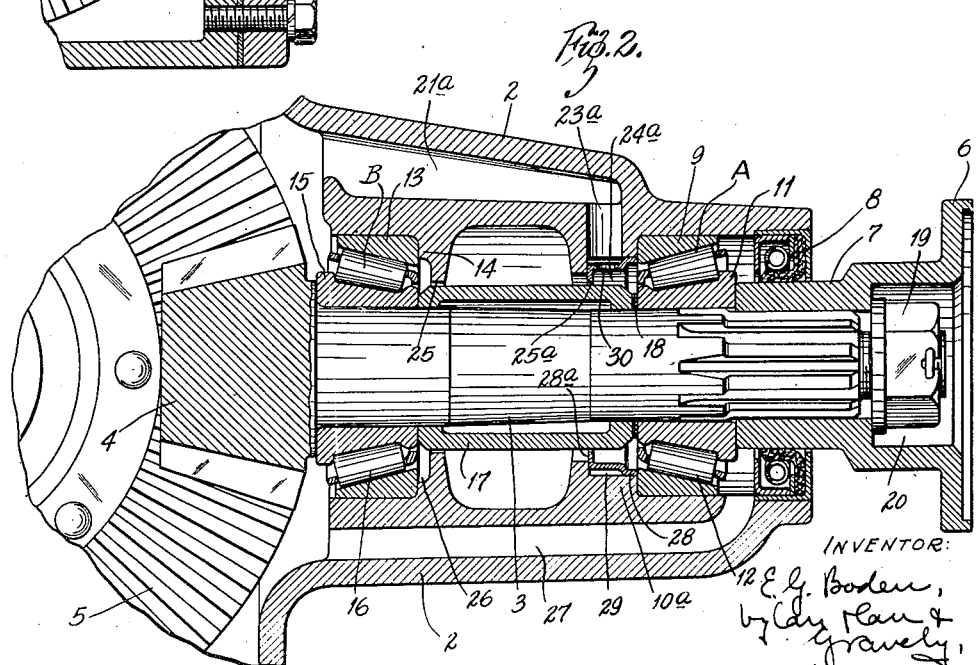

In the accompanying drawings which form part of this specification and wherein like symbols refer to like parts wherever they occur, Fig. 1 is a fragmentary vertical cross-sectional view of an automotive driving axle construction embodying my invention; and Figs. 2, 3 and 4 are similar views illustrating three modifications of the invention.

In the accompanying drawings, my invention is shown embodied in an automotive driving axle construction comprising an oil containing axle housing 1 provided above the level of the oil therein with a forwardly extending tubular portion or nosing 2. Mounted in the laterally projecting nosing 2 of the axle housing is a propeller shaft 3 whose rear end portion has a bevel pinion 4 thereon that intermeshes with a bevel ring gear 5 that dips into the oil in the lower portion of the housing 1 and drives the usual differential mechanism (not shown) located in said housing. The forward end of the propeller or pinion shaft 3 of the axle construction is provided with the usual driving disk 6, whose hub portion 7 extends into the outer end of the nosing 2; and the annular space between said hub and said nosing is closed by a suitable annular oil seal 8.

The pinion shaft is rotatably supported in the nosing of the axle housing by means of two longitudinally spaced taper roller bearings A and B, respectively. The outer or foremost bearing A comprises a cup or outer raceway member 9 seated in the nosing 2 with its large or inner end abutting against an internal annular rib 10 in said nosing, a cone or inner raceway member 11 mounted on said pinion shaft 3 with its large or outer end abutting against the hub 7 of the driving disk 6, and a series of conical bearing rollers 12 interposed between said cup and said cone. The inner or rearmost bearing B comprises a cup or outer raceway member 13 mounted in the nosing 2 with its large or forward end abutting against an internal annular rib 14 in said nosing, a cone or inner raceway member 15 mounted on the pinion shaft 3 with its large or rear end abutting against the back of the pinion 4, and a series of conical bearing rollers 16 interposed between said cup and said cone.

The two pinion shaft bearings A and B are spaced apart longitudinally of the pinion shaft by means of a spacing sleeve 17 sleeved thereon between the cones or inner raceway members of said bearings. The bearings are adjusted by means of shims 18 interposed between adjacent ends of the spacing sleeve 17 and the cone 11 of the foremost bearing A; and said inner raceway members, spacer sleeve and adjusting shims are clamped between the back of the pinion 4 and the hub 7 of the driving disk 6 by means of a nut 19 that is threaded on the forward end of the pinion shaft 3 in abutting relation to the bottom of an axial recess 20 provided therefor in the forward end of said driving disk.

In order to provide for lubrication of the two pinion shaft bearings A and B, the nosing 2 has a longitudinal oil feed or supply passageway 21 formed in the upper portion thereof with a relatively large mouth or inlet end portion 22 opening into the axle housing 1 in position to receive oil that is flung off the rotating ring gear 5 and/or pinion 4. The longitudinal oil supply passageway 21 slopes downwardly from the mouth or inlet end 22 thereof to a point adjacent to the inner end of the foremost pinion shaft bearing A where it communicates through a radial bore 23 of considerably smaller cross-sectional area with an annular recess 24 that is formed in the cup engaging face of the annular abutment rib 10 for said bearing and is in communication with the annular space occupied by the rollers 12 thereof. As shown in the drawings, a relatively small annular clearance space 25 is provided between each of the annular abutment ribs 10 and 14 and the cone spacing sleeve 17; and the rearmost abutment rib 14 has an annular recess 26 formed in its cup engaging face that communicates with the annular clearance space between the rib 14 and said spacing sleeve and with the annular bearing roller receiving space between the inner and outer raceway members of the rearmost roller bearing B. The nosing 2 also has a downwardly and rearwardly inclined oil return or drain passageway 27 extending longitudinally of the lower portion thereof. The oil drain or return passageway 27 opens upwardly at its forward or inlet end into the axial bore of the nosing 2 at a point between the forward end of the foremost bearing A and the annular oil seal 8 at the forward or outer end of said nosing, while the rearmost or inner end of said passageway opens or drains into the axle housing.

By the arrangement described, oil is carried upwardly by the ring gear 5 from the oil supply in the bottom of the axle housing and is flung by said ring gear or the pinion 4, or by both the ring gear and pinion, into the mouth or inner end 22 of the oil feed or supply passageway 21 in the upper portion of the nosing 2 of said housing. Such oil flows forwardly through the passageway 21, thence through the relatively small radial bore 23, where it is greatly restricted or throttled, and thence into the annular recess 24 in the internal annular abutment rib 10 for the foremost bearing A. Most of the oil in the annular recess 24 flows through the forward bearing A and is returned to the axle housing through the drain passageway 27 leading from the front end of said housing. Some of the oil in the annular recess 23 flows rearwardly through the relatively narrow annular passageways 25 between the abutment ribs 10 and 14 and the spacing sleeve 17, thence into the annular recess 26 in the cup engaging face of the rearmost abutment rib 14 and thence through the rearmost bearing B into the axle housing. Thus, a restricted but adequate supply of oil is fed to the foremost pinion shaft bearing A, while the flow of oil to the rearmost pinion shaft bearing B is also greatly reduced, thereby reducing power loss in the axle due to excessive lubrication of said bearings.

In the modification shown in Fig. 2, an annular recess 24a at the inner end of the foremost bearing A is formed by a sleeve 28 that seats in a counterbore in the internal annular abutment rib 10a of the nosing 2 and has its diameter reduced opposite the bore 23a at the delivery end of the oil supply passageway 21a to form an annular chamber 29. The bore 23a is of larger cross-sectional area than the bore 23 shown in Fig. 1; and the sleeve 28 has a radial hole 30 therein that establishes communication between the annular chamber 29 and the annular recess 24a and serves to restrict the flow of oil to the last mentioned recess and the forward bearing supplied thereby. The flow of oil to the rearmost bearing B is further restricted by means of an annular passageway or small clearance space 25a between the bearing spacing sleeve 17 and an internal annular flange 28a at the rear or inner end of the sleeve 28 and the annular clearance space 25 between said sleeve and the rearmost abutment rib 14.

In the modification shown in Fig. 3, the annular recess 24b in the bearing opposing face of the abutment rib 10b for the foremost bearing A has a ring 31 of felt or other porous material seated therein through which the oil must pass before reaching either of the bearings, thus causing a relative slow feed of the oil to said bearings. The front face of the felt ring 31 has a metal ring 32 secured thereto which seats in the annular recess; and this metal ring has a series of holes 33 extending therethrough through which the oil may pass from the felt ring to the foremost bearing. The felt and metal rings have their inner peripheral surfaces in flush alinement with the inner peripheral surface of the annular abutment rib 10b and a relatively small annular clearance space 25b is provided between said surfaces and the bearing spacing sleeve 17 to restrict the flow of oil to the rearmost bearing B, which flow is further restricted by means of a flanged ring 34 that is pressfitted in the rearmost annular rib 14b and provides a second narrow annular clearance space 25b or passage between said ring and said spacing sleeve.

In the modification shown in Fig. 4, the two internal annular abutment ribs 10c and 14c of the nosing 2 are bored out to receive a lining sleeve 35 which has a pressfit therein and spans the space therebetween. This lining or partition sleeve 35 is of larger diameter than the spacing sleeve 17 and cooperates with the spacing sleeve to form an annular passage 36 between said sleeves and an annular chamber 37 around the sleeve 35 between the abutment ribs 10c and 14c. The sleeve 35 has a flanged ring 38 welded therein near the foremost bearing that provides a restricted annular opening 25c for flow of oil to the rearmost bearing. The bore 23c at the delivery end of the supply passageway 21c opens into the annular chamber 37 around the sleeve 35; and said sleeve has a radial hole 39 therein which is of smaller diameter than the bore 23c and establishes communication between said chamber and the annular passageway 36 between the flanged ring 38 and the foremost bearing A.

While I have described my invention as applied to the pinion shaft bearings of an automotive axle, it is applicable to other shaft bearings also.

Reference is hereby made to my copending application Serial No. 556,187 filed September 28, 1944, for subject matter shown but not claimed herein.

What I claim is:

1. A lubricant containing housing having a tubular nosing projecting therefrom above the level of the lubricant therein, a shaft extending through said nosing, two axially spaced rotary antifriction bearings interposed between said nosing and said shaft, and gearing in said housing including a gear having its lower portion disposed in the lubricant in said housing and a pinion on said shaft intermeshing with said gear, said nosing having an annular chamber therein opposite to and in communication with the inner end of the outermost bearing and entirely within the projected periphery thereof, a supply passageway with an inlet in position to receive lubricant flung off from said gearing and with a single throttled outlet opening directly into said annular chamber, and an annular throttling passageway providing restricted communication between said annular chamber and the innermost bearing, whereby a restricted flow of lubricant is provided from said supply passageway through said single throttled outlet into said annular chamber, from said annular chamber into the inner end of said outermost bearing and from said annular chamber through said annular throttling passageway into said innermost bearing.

2. A lubricant containing housing having a tubular nosing projecting therefrom above the level of the lubricant therein, a shaft extending through said nosing, axially spaced rotary antifriction bearings interposed between said nosing and said shaft, a spacing sleeve mounted on said shaft between said bearings, and gearing in said housing including a gear having its lower portion disposed in the lubricant in said housing and a pinion on said shaft intermeshing with said gear, said nosing having an annular chamber therein around said sleeve opposite to and in communication with the inner end of the outermost bearing and entirely within the projected periphery thereof, a passageway having an inlet of relatively large cross-sectional area in position to receive lubricant flung off from said gearing and a single outlet of relatively small cross-sectional area opening directly into said chamber and substantially restricting the flow of such lubricant thereto, a relatively narrow annular passageway around said sleeve providing restricted flow of lubricant from said annular chamber to the outer end of the innermost bearing, and a passageway for returning to said housing lubricant that passes through said outermost bearing.

3. A lubricant containing housing having a tubular nosing projecting therefrom above the level of the lubricant therein, a shaft extending through said nosing, two axially spaced antifriction bearings interposed between said nosing and said shaft, a spacing sleeve mounted on said shaft between said bearings, and gearing in said housing including a gear with its lower portion disposed in said lubricant and a pinion on said shaft intermeshing with said gear, said nosing having an annular chamber surrounding said sleeve adjacent to and in direct communication with the inner end of the outermost bearing and entirely within the projected periphery thereof, a supply passageway with an inlet in position to receive lubricant flung off from said gearing and with a restricted throttling outlet opening directly into said annular chamber, said nosing having a return passageway opening at one end into said housing and at the outer end into said nosing outwardly of said bearing, and a plurality of axially spaced internal annular ribs between the throttling portion of said supply passageway and the innermost bearing that cooperate with said spacing sleeve to provide restricted annular passageways therebetween.

4. A lubricant containing housing having a tubular nosing projecting laterally therefrom above the level of the lubricant therein, a shaft extending through said nosing, two axially spaced rotary antifriction bearings interposed between said nosing and said shaft, a spacing sleeve mounted on said shaft between said bearings, and gearing in said housing including a gear with its lower portion disposed in said lubricant and a pinion on said shaft intermeshing with said gear, said nosing having an internal annular abutment rib therein for the inner end of the outermost bearing and an internal annular abutment rib for the outer end of the innermost bearing, each of said ribs having an annular recess in its bearing opposing face in communication with the bearing abutting thereagainst, said nosing having a longitudinal supply passageway in the upper portion thereof adapted to receive lubricant flung off from said gearing, said passageway having a single restricted throttling portion opening downwardly directly into the annular recess in the abutment rib for said outermost bearing, said nosing having a return passageway opening at one end into said housing and at the other end into said nosing outwardly of said outermost bearing, each of said abutment ribs having its inner periphery located close to but clear of said sleeve to provide restricted passageways for the flow of lubricant therethrough from the annular recess in the abutment rib for the outermost bearing to the annular recess in the abutment rib for the innermost bearing.

5. A lubricant containing housing having a tubular nosing projecting therefrom above the level of the lubricant therein, a shaft extending through said nosing, axially spaced rotary antifriction bearings interposed between said nosing and said shaft, a spacing sleeve mounted on said shaft between said bearings, gearing in said housing including a gear with its lower portion disposed in said lubricant and a pinion on said shaft intermeshing with said gear, said nosing having an upper supply passageway therein in position to receive lubricant flung off from said gearing, and a lower return passageway opening at one end into said housing and at the other end into said nosing outwardly of the outermost bearing, said nosing having an annular abutment therein for the inner end of said outermost bearing, said abutment having an annular recess in the bearing engaging face thereof, a second sleeve seated in said annular recess and forming therewith an annular chamber in communication with said supply passageway, said second sleeve communicating at its forward end with said outermost bearing and having a radial opening establishing communication between said annular chamber and the interior of said second sleeve, said second sleeve having an internal annular flange that is disposed inwardly of said radial opening and cooperates with said spacing sleeve to form an annular throttling passageway providing restricted flow of lubricant from the interior of said second sleeve to the innermost bearing.

6. A lubricant containing housing having a tubular nosing projecting therefrom above the level of the lubricant therein, a shaft extending through said nosing, axially spaced antifriction bearings interposed between said nosing and said shaft, a spacing sleeve mounted on said shaft between said bearings, gearing in said housing including a gear with its lower portion disposed in said lubricant and a pinion on said shaft intermeshing with said gear, said nosing having an upper longitudinal supply passageway in position to receive lubricant flung off from said gearing, and a lower longitudinal return passageway opening at one end into said housing and at the other end into said nosing outwardly of the outermost bearing, said nosing having internal annular abutment ribs therein for the opposing ends of said bearings, the abutment rib for said outermost bearing having an annular recess in the bearing opposing face thereof, a second sleeve seated in said annular recess in the abutment rib for said outermost bearing and forming therewith an annular chamber in communication with said supply passageway, said second sleeve opening into the rear end of said outermost bearing and having a radial opening establishing communication between said annular chamber and the interior of said second sleeve, said second sleeve having an internal annular flange that is disposed inwardly of said radial opening, said flange and the abutment rib for the innermost bearing cooperating with said spacing sleeve to form annular throttling passageways for restricting the flow of lubricant from the interior of said second sleeve to the innermost bearing.

7. A lubricant containing housing having a tubular nosing projecting laterally therefrom above the level of the lubricant therein, a shaft extending through said nosing, axially spaced rotary antifriction bearings interposed between said nosing and said shaft, a spacing sleeve mounted on said shaft between said bearings, gearing in said housing including a gear with its lower portion disposed in said lubricant and a pinion on said shaft intermeshing with said gear, said nosing having a supply passageway in position to receive lubricant flung off from said gearing and a return passageway opening at one end into said housing and at the other end into said nosing outwardly of the outermost bearing, and a second sleeve mounted in said nosing between said bearings and cooperating with said spacing sleeve to form an annular passageway between said bearings, said second sleeve having an opening in the wall thereof establishing communication between said annular passageway and said supply passageway and having a ring therein that cooperates with said spacing sleeve to provide a restricted passageway in said annular passageway between said inlet opening and the innermost bearing.

8. A lubricant containing housing having a tubular nosing projecting therefrom above the level of the lubricant therein, a shaft extending through said nosing, axially spaced rotary antifriction bearings interposed between said nosing and said shaft, a spacing sleeve mounted on said shaft between said bearings, gearing in said housing including a gear with its lower portion disposed in said lubricant and a pinion on said shaft intermeshing with said gear, said nosing having an upper passageway in position to receive lubricant flung off from said gearing and a passageway opening at one end into said housing and at the other end into said nosing outwardly of said bearings, and a second sleeve mounted in said nosing between said bearings and cooperating with said spacing sleeve to form an inner annular passageway between said bearings and with said nosing to form an outer annular passageway in communication with said upper passageway, said second sleeve having an inlet opening in the wall thereof establishing communication between said annular passageways and having an internal annular wall that cooperates with said spacing sleeve to provide an annular restriction in said inner annular passageway between said opening and the rearmost of said bearings.

ERNEST G. BODEN.